US012223347B2

(12) United States Patent
Ray

(10) Patent No.: US 12,223,347 B2
(45) Date of Patent: Feb. 11, 2025

(54) VOLATILE MEMORY ACQUISITION

(71) Applicant: Microsoft Technology Licensing, LLC, Redmond, WA (US)

(72) Inventor: Marsh Jordan Ray, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 693 days.

(21) Appl. No.: 17/333,449

(22) Filed: May 28, 2021

(65) Prior Publication Data

US 2022/0237026 A1 Jul. 28, 2022

Related U.S. Application Data

(60) Provisional application No. 63/142,699, filed on Jan. 28, 2021.

(51) Int. Cl.
*G06F 9/455* (2018.01)
*G06F 9/48* (2006.01)
*G06F 12/06* (2006.01)
*G06F 21/56* (2013.01)

(52) U.S. Cl.
CPC ........ *G06F 9/4856* (2013.01); *G06F 9/45558* (2013.01); *G06F 12/0646* (2013.01); *G06F 21/562* (2013.01); *G06F 2009/45575* (2013.01); *G06F 2212/152* (2013.01); *G06F 2221/034* (2013.01)

(58) Field of Classification Search
CPC .................................................. G06F 9/4856
USPC ........................................................... 718/1
See application file for complete search history.

(56) References Cited

U.S. PATENT DOCUMENTS

| 9,495,269 | B1* | 11/2016 | Hart | G06F 3/0647 |
|---|---|---|---|---|
| 9,524,389 | B1* | 12/2016 | Roth | G06F 9/45558 |
| 9,928,146 | B2* | 3/2018 | Nallathambi | G06F 11/1464 |
| 10,019,575 | B1* | 7/2018 | Wang | G06F 9/45533 |
| 10,404,579 | B1* | 9/2019 | Biemueller | H04L 41/0803 |
| 10,536,471 | B1* | 1/2020 | Derbeko | G06F 21/53 |

(Continued)

OTHER PUBLICATIONS

"International Search Report and Written opinion Issued in PCT Application No. PCT/US22/011510", Mailed Date: Apr. 20, 2022, 10 Pages.

*Primary Examiner* — Mehran Kamran

(57) ABSTRACT

Aspects of the present disclosure relate to volatile memory acquisition using live migration of an execution environment. In examples, a virtualization manager controls execution of an execution environment at a virtualization host. The virtualization manager may enable live migration of the execution environment, such that the execution environment may be migrated to another virtualization host (or "migration target") for continued execution. Accordingly, such functionality may be used to capture a memory image at a migration target, after which the execution environment continues executing at the original virtualization host. The memory image may be analyzed to identify the presence of malware and/or to generate a list of processes that were executing at the time of the capture. Such aspects may enable capturing a substantially accurate and consistent memory image of the volatile memory of the execution environment without indicating, inadvertently or otherwise, that a capture is occurring to processes executing therein.

20 Claims, 9 Drawing Sheets

(56) References Cited

U.S. PATENT DOCUMENTS

| | | | |
|---|---|---|---|
| 10,552,610 B1* | 2/2020 | Vashisht | G06F 3/0619 |
| 10,733,295 B2* | 8/2020 | El-Moussa | G06F 21/53 |
| 10,877,931 B1* | 12/2020 | Nadiminti | G06F 11/1453 |
| 11,281,492 B1* | 3/2022 | Rebeja | G06F 9/5077 |
| 11,573,814 B1* | 2/2023 | Aithal | G06F 16/188 |
| 11,734,430 B2* | 8/2023 | Edwards | G06F 9/455 |
| | | | 726/25 |
| 2009/0007100 A1* | 1/2009 | Field | G06F 21/566 |
| | | | 718/1 |
| 2011/0145471 A1* | 6/2011 | Corry | G06F 9/4856 |
| | | | 718/1 |
| 2012/0159101 A1* | 6/2012 | Miyoshi | G06F 12/109 |
| | | | 711/E12.103 |
| 2012/0185856 A1* | 7/2012 | Ashihara | G06F 9/45558 |
| | | | 718/1 |
| 2012/0324236 A1* | 12/2012 | Srivastava | H04L 9/3234 |
| | | | 713/189 |
| 2014/0146055 A1* | 5/2014 | Bala | G06F 8/63 |
| | | | 345/501 |
| 2014/0304819 A1* | 10/2014 | Ignatchenko | G06F 9/45533 |
| | | | 726/24 |
| 2015/0074659 A1* | 3/2015 | Madsen | G06F 9/45558 |
| | | | 717/177 |
| 2018/0004939 A1* | 1/2018 | Kawakita | H04L 63/1433 |
| 2018/0060100 A1* | 3/2018 | Tsirkin | G06F 9/5088 |
| 2018/0183580 A1* | 6/2018 | Scarlata | G06F 21/53 |
| 2019/0340003 A1* | 11/2019 | Ramanathan | G06F 9/5077 |
| 2020/0097323 A1* | 3/2020 | Nider | G06F 3/067 |
| 2020/0236119 A1* | 7/2020 | Chamarajnager | G06F 9/45558 |
| 2020/0351347 A1* | 11/2020 | Chang | G06F 11/1458 |
| 2020/0409803 A1* | 12/2020 | Naidu | G06F 11/1469 |
| 2021/0049031 A1* | 2/2021 | Halcrow | G06F 21/78 |
| 2021/0234872 A1* | 7/2021 | Mitra | H04L 63/1416 |
| 2021/0349767 A1* | 11/2021 | Asayag | G06F 9/4856 |
| 2022/0004423 A1* | 1/2022 | Brooker | G06F 9/466 |
| 2022/0121503 A1* | 4/2022 | Bhide | H04L 41/5025 |
| 2022/0237026 A1* | 7/2022 | Ray | G06F 21/53 |
| 2023/0004641 A1* | 1/2023 | Ray | G06F 21/552 |
| 2023/0056426 A1* | 2/2023 | Halcrow | G06F 21/566 |

* cited by examiner

VOLATILE MEMORY ACQUISITION

CROSS-REFERENCE TO RELATED APPLICATION

This application claims priority to U.S. Provisional Application No. 63/142,699, titled "Volatile Memory Acquisition," filed on Jan. 28, 2021, the entire disclosure of which is hereby incorporated by reference in its entirety.

BACKGROUND

Volatile memory of an execution environment may be captured for any of a variety of reasons, such as performing forensic memory analysis. However, it may be challenging to capture the memory in a way that does not affect its contents or, as another example, does not alert malware to the capture such that the malware may eliminate or obfuscate itself from the capture.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to volatile memory acquisition using live migration of an execution environment. In examples, a virtualization manager controls execution of an execution environment at a virtualization host. The virtualization manager may enable live migration of the execution environment, such that the execution environment may be migrated to another virtualization host (or "migration target") for continued execution. Accordingly, such live migration functionality may be used to capture a memory image for the execution environment at a migration target, after which the execution environment continues executing at the original virtualization host. The memory image may be analyzed to identify the presence of malware and/or to generate a list of processes that were executing at the time of the memory capture.

Such aspects may enable capturing a substantially accurate and consistent memory image of the volatile memory of the execution environment without indicating, inadvertently or otherwise, that a capture is occurring to processes executing therein. Thus, as an example, it may not be feasible for malware to adapt its behavior to avoid detectability from such memory capture techniques.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
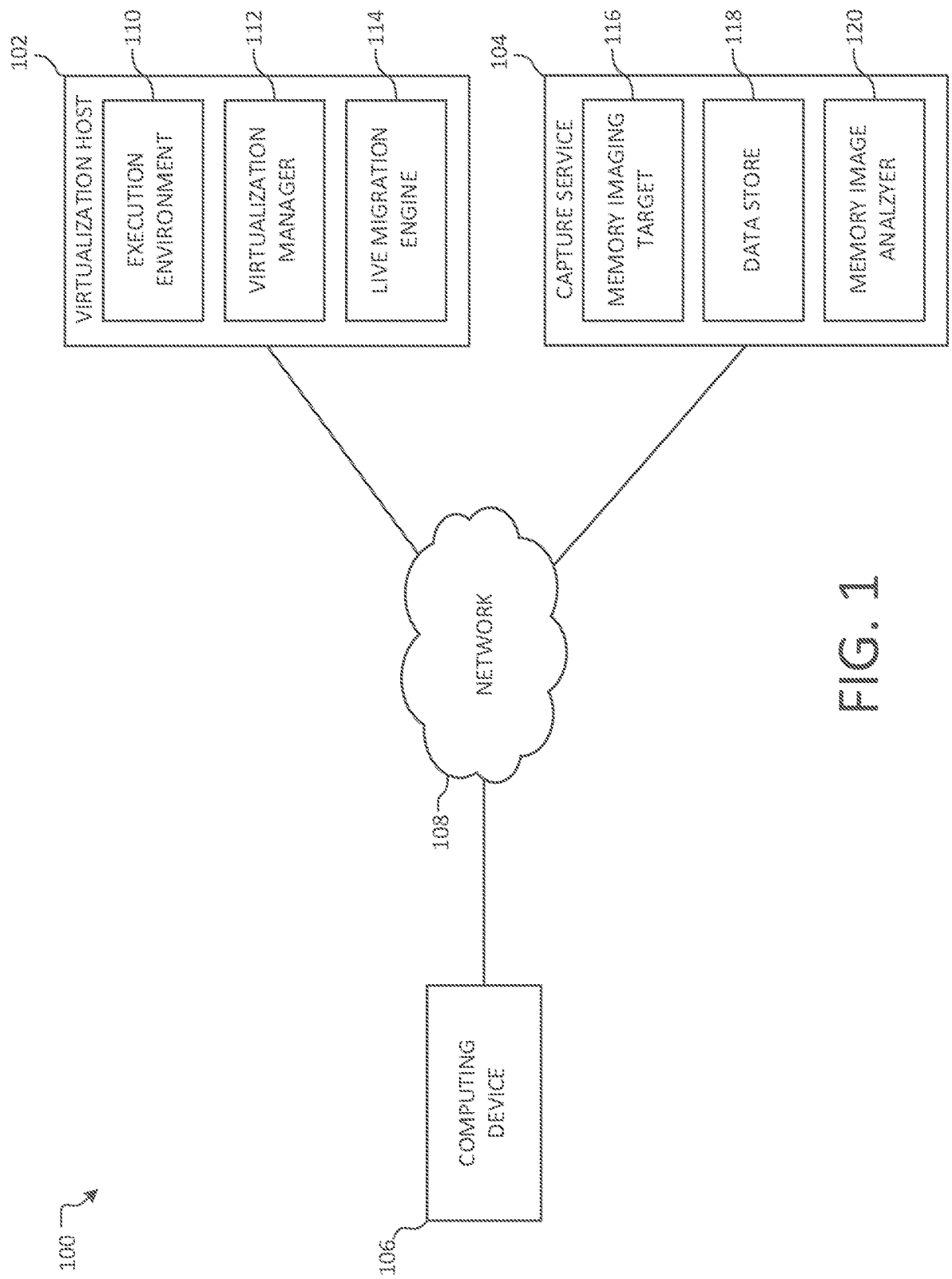
FIG. 1 illustrates an overview of an example system for volatile memory acquisition.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, volatile memory associated with an execution environment may be captured for subsequent analysis. An example execution environment includes, but is not limited to, a guest virtual machine managed by a hypervisor of a host computing device. As another example, an execution environment may be that of a container executing on a host computing device. Thus, it will be appreciated that aspects of the present disclosure may be used to capture volatile memory of any of a variety of execution environments. A memory image may be generated for the volatile memory, such that the memory image may be analyzed to identify the presence of malware (e.g., rootkits, ransomware, and/or viruses), as well as to determine which processes were executing when the memory image was captured, among other examples.

However, certain techniques may provide an indication (inadvertently or otherwise) to the execution environment that a memory image is being created. As an example, a guest process may execute within the execution environment to manage execution of the execution environment. The guest process may prepare the execution environment for imaging by performing any of a variety of functions, including, but not limited to, purging cached data or terminating one or more processes that are not critical to the execution of the execution environment. Accordingly, malware may identify these or other signals, such that it may eliminate itself from or obfuscate itself within the memory capture. As another example, the guest process may perform at least a part of the memory capture operation, such that the capture process itself may affect the content of the volatile memory during the capture. Thus, such memory capture techniques may make it difficult or even impossible to generate a memory image that captures a substantially accurate and consistent memory image of the volatile memory of the execution environment.

Accordingly, aspects of the present application relate to volatile memory acquisition using live migration of an execution environment. A virtualization manager (e.g., a virtual machine hypervisor, a container engine, etc.) may enable an execution environment to be migrated from one virtualization host to another virtualization host (which may be referred to herein as a "migration target") without substantially affecting execution (e.g., avoiding or minimizing closed TCP connections, timing changes that affect software executing within the execution environment, etc.), thereby maintaining substantially continuous execution of the execution environment. Such techniques are referred to herein as "live migration." Thus, as part of live migration, the virtualization manager transmits the volatile memory content associated with the execution environment to the migration target, thereby enabling continued execution of the execution environment at the migration target.

As an example, live migration of the volatile memory may be iterative, where the virtualization manager transmits data from the volatile memory as part of a first pass, after which the virtualization manager performs one or more additional passes to transmit additional data in volatile memory that has changed as compared to an earlier pass. As another example, the virtualization manager may take a memory snapshot, temporarily lock certain regions of memory, and/or temporarily suspend execution of one or more associated processes. Thus, it will be appreciated that any of a variety of techniques may be used to transmit volatile memory as part of a live migration operation.

According to aspects of the present disclosure, the migration target may store the received volatile memory content as a memory image in a file or as a blob in a data store, among other examples. Thus, a migration target implementing such memory imaging functionality may be referred to herein as a "memory imaging target." Such aspects may be performed as an alternative to loading the received volatile memory content into the volatile memory (e.g., as would be the case when performing a live migration operation by an ordinary migration target). As another example, the data may be stored in addition to loading the received volatile memory content into the volatile memory at the migration target (e.g., such that the memory is cached before it is stored and/or such that the execution environment may ultimately be migrated for continued execution at a new virtualization host). In some examples, once the memory image is stored by the memory imaging target, the virtualization manager may continue execution of the execution environment on the initial virtualization host rather than completing the live migration operation.

Thus, such live migration functionality is used to capture volatile memory of the execution environment without requiring that live migration of the execution environment be completed and, further, without substantially affecting the content of the volatile memory or execution of the execution environment. Further, a virtualization host may have insufficient storage to store the memory image locally (e.g., the amount of volatile memory may exceed available storage space). As such, aspects described herein may facilitate memory acquisition in instances where computing resource constraints would otherwise hinder or prohibit generation of a memory image. In examples, a cloud services provider may operate one or more virtualization hosts, such that a customer may utilize a virtualization host to host an execution environment on its behalf. Further, each virtualization host may execute any number of execution environments, each of which may be associated with the same customer or different customers.

FIG. 1 illustrates an overview of an example system 100 for volatile memory acquisition. As illustrated, system 100 comprises virtualization host 102, capture service 104, computing device 106, and network 108. In examples, virtualization host 102, capture service 104, and computing device 106 communicate using network 108, which may comprise a local area network, a wireless network, or the Internet, or any combination thereof, among other examples. As an example, virtualization host 102 and capture service 104 may be part of a data center, such that they communicate over a local area network.

Virtualization host 102 is illustrated as comprising execution environment 110, virtualization manager 112, and live migration engine 114. In examples, virtualization manager 112 manages execution of execution environment 110. For example, virtualization manager 112 may provide, expose, or otherwise manage one or more physical or virtual devices (e.g., network adapters, virtual processors and/or associated logical processors, etc.) used by execution environment 110. Virtualization manager 112 may be a hypervisor and execution environment 110 may be a virtual machine. As another example, virtualization manager 112 may be a container engine and execution environment 110 may be a container. Thus, it will be appreciated that, in some examples, multiple such execution environments and/or associated virtualization managers execute on the same virtualization host.

Virtualization host 102 is further illustrated as comprising live migration engine 114. In examples, live migration engine 114 facilitates migration of execution environment 110 from virtualization host 102 to another virtualization host (not pictured) with reduced or minimal disruption to execution of execution environment 110, as described above. For example, live migration engine 114 may cause virtualization manager 112 to initiate live migration, such that it transmits the volatile memory content to a migration target (e.g., memory imaging target 116). It will be appreciated that, while live migration engine 114 is illustrated as separate from virtualization manager 112, in some instances at least a part of the functionality described herein with respect to live migration engine 114 may be incorporated into virtualization manager 112, or vice versa.

Capture service 104 is illustrated as comprising memory imaging target 116, data store 118, and memory image analyzer 120. In examples, live migration of execution environment 110 is initiated to migrate execution environment 110 to memory imaging target 116. For example, the live migration operation may be initiated by live migration engine 114 (which may coordinate with virtualization manager 112). For example, live migration engine 114 may communicate with memory imaging target 116 to coordinate the live migration operation. As another example, memory imaging target 116 may initiate the live migration operation by communicating with live migration engine 114. Thus, memory imaging target 116 may implement at least some functionality similar to that of an ordinary live migration target (e.g., as may be provided by a virtualization host).

As a result of initiating a live migration operation, memory imaging target 116 may receive volatile memory content associated with execution environment 110 (e.g., from virtualization manager 112). Accordingly, memory imaging target 116 may store the received volatile memory content in data store 118, thereby generating a memory image for execution environment 110. For example, the memory image may be stored as a file or as a blob in data store 118, among other examples.

In some instances, memory imaging target 116 may receive an indication from live migration engine 114 (e.g., when initiating the live migration, during the memory transfer, or after the memory transfer) indicating an execution environment identifier and/or a customer identifier associated with execution environment 110 and/or virtualization host 102, such that the memory image may be associated with the execution environment and/or customer in data store 118 accordingly, among other examples. In some examples, data store 118 may store multiple memory images for a given execution environment. For example, the volatile memory acquisition techniques described herein may be performed according to a schedule or in response to any of a variety of events (e.g., software changes, network traffic or communication patterns, and/or a request from computing device 106).

In some instances, execution environment 110 may undergo an actual live migration as a result of determining that virtualization host 102 is operating in a degraded state or has begun to fail. Accordingly, such a live migration may take precedence over the memory acquisition techniques described herein, such that memory acquisition may be paused or terminated in order to permit an actual live migration of execution environment 110 to occur. As another example, memory acquisition may occur as part of the actual live migration, as discussed above.

Capture service 104 further comprises memory image analyzer 120. In examples, memory image analyzer 120 processes memory images stored in data store 118 (e.g., as may be stored by memory imaging target 116) to identify the presence of malware or to generate a list of processes that were executing in the execution environment (e.g., execution environment 110) at the time the memory image was captured. It will be appreciated that any of a variety of additional or alternative processing may be performed by memory image analyzer 120. For example, memory image analyzer 120 may process a memory image according to a set of user-defined rules or other instructions, such that the analysis performed by memory image analyzer 120 may be customized.

In examples, capture service 104 provides a website and/or application programming interface (API) via which a user can control operation of capture service 104 and view or otherwise access memory analysis results generated by memory image analyzer 120. For example, computing device 106 may request that a memory image be captured of execution environment 110 (e.g., now and/or according to a schedule) according to aspects described herein. For example, computing device 106 may provide an indication to capture service 104 to initiate a memory capture operation. The indication may comprise an identifier associated with execution environment 110, as well as a set of capture instructions (e.g., a time at which the capture should be taken, an event in response to which the capture should be taken, one or more regions of memory to capture, user-defined rules for use by memory image analyzer 120, etc.). Accordingly, memory imaging target 116 and live migration engine 114 may generate a memory image of execution environment 110 based on the indication from computing device 106.

As another example, computing device 106 may access or otherwise receive a memory analysis result generated by memory image analyzer 120. For example, a web browser application of computing device 106 may be used to access the website associated with capture service 104, on which memory analysis results associated with execution environment 110 may be presented. As another example, a native application executing on computing device 106 may access such information using an API provided by capture service 104. Thus, it will be appreciated that any of a variety of techniques may be used to interact with or otherwise manage capture service 104 according to aspects of the present disclosure.

While system 100 is illustrated as comprising a single virtualization host 102, a single capture service 104, and a single computing device 106, it will be appreciated that any number of such elements may be used in other examples. Further, the functionality described above may be distributed among virtualization host 102, capture service 104, and/or computing device 106 according to any of a variety of other paradigms in other examples. For example, capture service 104 may be used in conjunction with any number of virtualization hosts, such that capture service 104 may serve as a centralized repository of captured memory images and associated memory analysis processing. As another example, memory analysis may be performed local to computing device 106 in addition to or as an alternative to memory analysis performed by memory image analyzer 120 of capture service 104. In a further example, aspects described above with respect to memory imaging target 116 may alternatively or additionally be performed by computing device 106, such that volatile memory content is transmitted to and stored by computing device 106, rather than capture service 104. Additionally, it will be appreciated that capture service 104 need not be implemented separately from virtualization host 102, such that, for example, memory imaging target 116, execution environment 110, and virtualization manager 112 may all be implemented by virtualization host 102.

Figure 2:
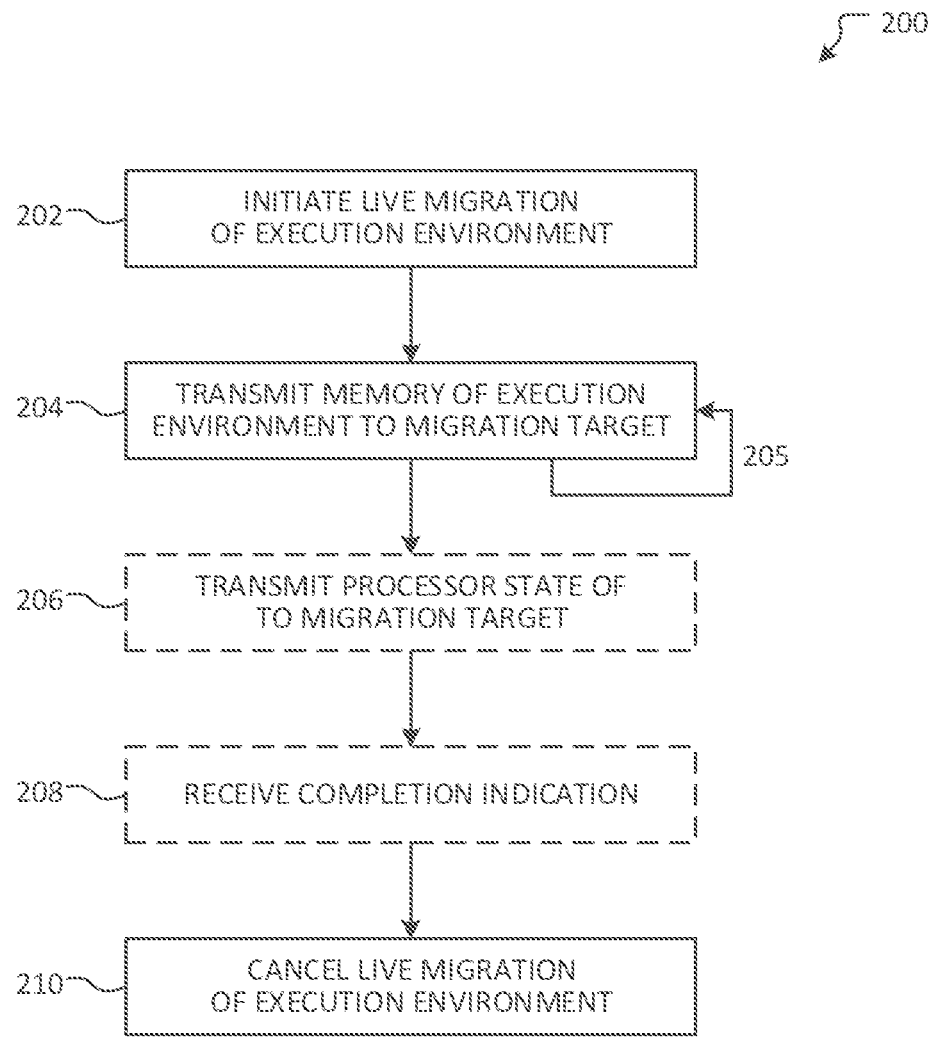
FIG. 2 illustrates an overview of an example method for performing volatile memory acquisition according to aspects described herein.

FIG. 2 illustrates an overview of an example method 200 for performing volatile memory acquisition according to aspects described herein. In examples, aspects of method 200 are performed by a virtualization host, such as virtualization host 102 in FIG. 1. For example, a virtualization manager and/or a live migration engine may perform such aspects, such as such as virtualization manager 112 and/or live migration engine 114 in FIG. 1, respectively.

Method 200 begins at operation 202, where live migration of an execution environment is initiated. In examples, initiating live migration comprises providing an indication to a migration target (e.g., memory imaging target 116). The indication may comprise an execution environment identifier and/or a customer identifier associated with the execution environment and/or an associated virtualization host, as described above. In some instances, operation 202 comprises preparing the execution environment for live migration, for example creating a snapshot of associated volatile memory at a given point in time, such that the snapshot may be transmitted, along with subsequent changes to the volatile memory as compared to the snapshot.

At operation 204, the volatile memory content of the execution environment is transmitted to the migration target. Arrow 205 is provided to indicate that, in some examples, transmitting memory of the execution environment may be an iterative process. For example, the content of an initial memory snapshot may be transmitted to the migration target, after which changes may be iteratively transmitted. Flow may loop for a certain number of iterations or until the volatile memory content transmitted to the migration target is consistent with the volatile memory of the virtualization host.

Eventually, flow may progress to operation 206, where a processor state is transmitted to the migration target. In some instances, operations 204 and 206 may occur contemporaneously, such that the processor state matches that of the volatile memory content. Example processor state includes, but is not limited to, the content of one or more registers. It will be appreciated that, in other examples, additional or alternative state information may be transmitted. For example, state information relating to one or more physical or virtual devices. Operation 206 is illustrated using a dashed box to indicate that, in other examples, operation 206 may be omitted such that flow progresses from operation 204 to operation 208 (or from operation 204 to 210, as discussed below).

In some instances, flow may progress to operation 208, where a completion indication is received from the migration target. For example, the migration target may confirm that the data transmitted at operation 204 has been successfully stored or matches a checksum (e.g., as may be transmitted to the migration target as part of operation 204). Operation 208 is illustrated using a dashed box to indicate that, in other examples, operation 208 may be omitted such that the migration target need not provide an affirmative indication that the transmission is complete. Thus, flow may progress directly from operation 204 or 206 to operation 210.

At operation 210, live migration of the execution environment is cancelled. For example, operation 210 may comprise reverting one or more operations that were performed at operation 202, thereby returning the execution environment to a normal operating state. In some instances, operation 210 may comprise closing a communication channel with the migration target. In other instances, normal operation of the execution environment may resume or continue automatically, by virtue of an incomplete or seemingly failed live migration operation (even though the memory capture was completed successfully as described herein). Thus, it will be appreciated that operation 210 need not comprise an explicit indication to cancel the live migration that was initiated at operation 202. Flow terminates at operation 210.

Figure 3:
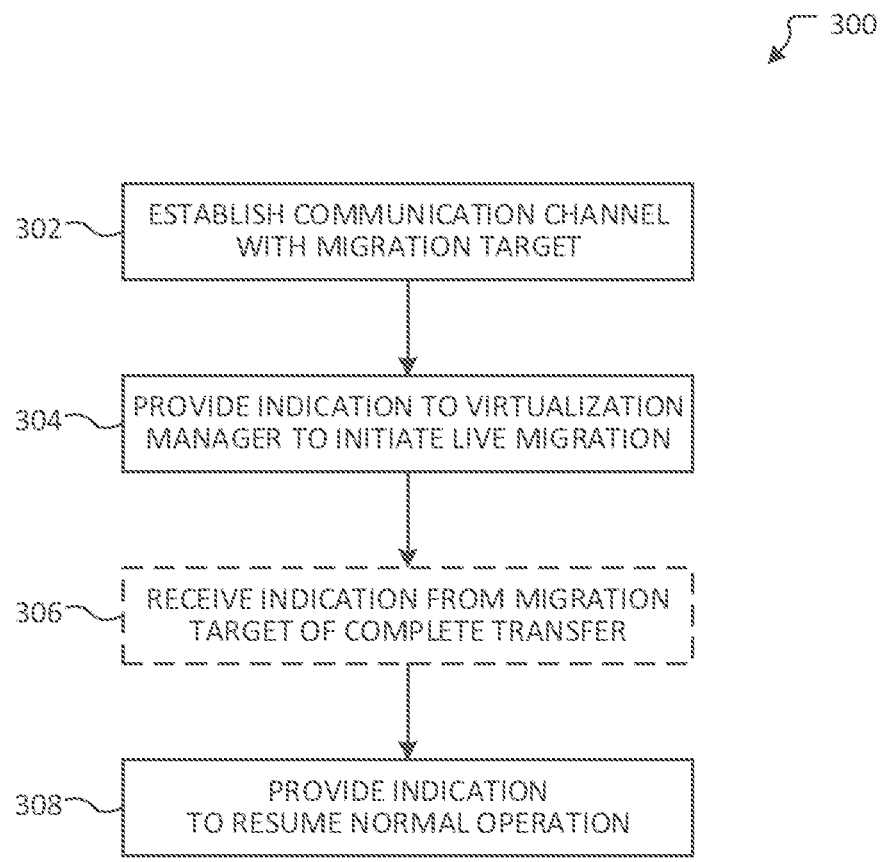
FIG. 3 illustrates an overview of another example method for performing volatile memory acquisition according to aspects described herein.

FIG. 3 illustrates an overview of another example method 300 for performing volatile memory acquisition according to aspects described herein. In examples, aspects of method 300 are performed by a virtualization host, such as virtualization host 102 in FIG. 1. For example, a live migration engine (e.g., live migration engine 114) may perform aspects of method 300 to facilitate live migration volatile memory acquisition by a virtualization manager (e.g., virtualization manager 112) according to aspects described herein.

Method 300 begins at operation 302, where a communication channel is established with a migration target. For example, a control communication channel may be established over a transmission control protocol (TCP) connection to the migration target (e.g., memory imaging target 116 of capture service 104 in FIG. 1). In examples, operation 302 comprises providing an execution environment identifier and/or a customer identifier associated with the execution environment and/or an associated virtualization host, as described above. In some instances, target information may be received from the migration target at operation 302, such as a uniform resource locator or a unique identifier. The target information may specify a destination to which the volatile memory data should be transmitted. Thus, the communication channel may be used to prepare the migration target for capturing the memory image using live migration techniques as described herein.

At operation 304, an indication is provided to a virtualization manager to initiate live migration. For example, live migration engine 114 may provide an indication to virtualization manager 112, thereby causing virtualization manager 112 to initiate migration of the execution environment to memory imaging target 116 of FIG. 1 (e.g., as a result of performing operations 204 and/or 206 of method 200 in FIG. 2). In some examples, the indication comprises the target information that was received from the migration target as part of operation 302, thereby directing the virtualization manager to initiate live migration to the migration target associated therewith.

Flow progresses to operation 306, where an indication is received from the migration target that the transfer is complete. Operation 306 is illustrated using a dashed box to indicate that, in other examples, operation 306 may be omitted such that an affirmative indication that the transfer has completed to the migration target need not be received. As an example, an indication may instead be received from or otherwise determined based at least in part on the state of the virtualization manager. For instance, the virtualization manager may indicate that the memory was successfully transferred such that execution may continue at the migration target.

At operation 308, an indication is provided to the virtualization manager to resume normal operation of the execution environment. As discussed above, the indication may cause the virtualization manager to revert one or more operations that were performed in response to the indication to initiate live migration that was provided at operation 304. In some instances, operation 308 may comprise closing a communication channel with the migration target (e.g., as was established at operation 302). Thus, such aspects may be performed in response to the indication received at operation 306. In other instances, a virtualization manager (e.g., virtualization manager 112) may continue normal operation of the execution environment automatically by virtue of an incomplete or failed live migration operation. Thus, it will be appreciated that operation 308 need not comprise an explicit indication to resume normal operation of the execution environment in other examples. Flow terminates at operation 308.

Figure 4:
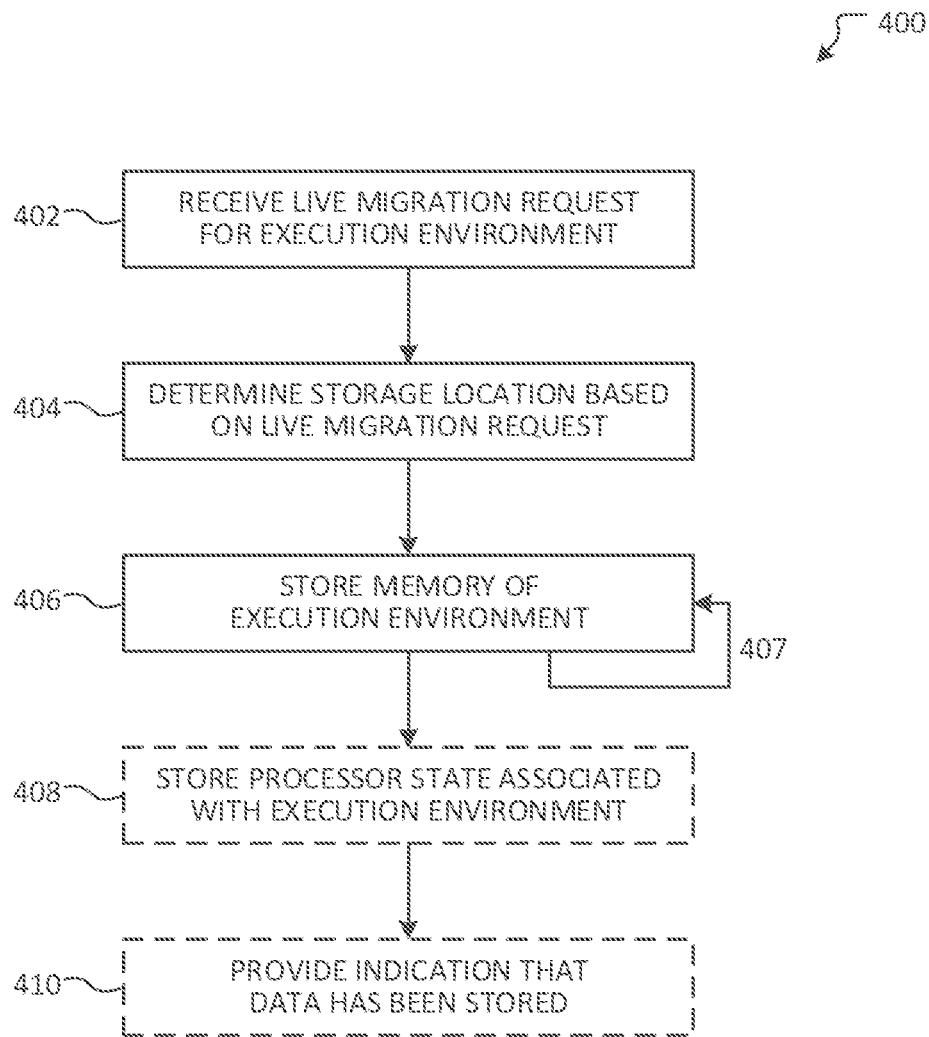
FIG. 4 illustrates an overview of an example method for generating a memory image using volatile memory acquisition according to aspects described herein.

FIG. 4 illustrates an overview of an example method 400 for generating a memory image using volatile memory acquisition according to aspects described herein. In examples, aspects of method 400 are performed by a migration target, such as memory imaging target 116 of capture service 104 in FIG. 1.

Method 400 begins at operation 402, where a live migration request is received for an execution environment. For example, the live migration request may be received from a virtualization manager (e.g., virtualization manager 112 in FIG. 1) performing aspects of operation 202 in FIG. 2 or a live migration engine (e.g., live migration engine 114) performing aspects of operation 302 in FIG. 3. As discussed above, the live migration request may comprise an execution environment identifier and/or a customer identifier associated with the execution environment and/or an associated virtualization host. In some instances, operation 402 comprises providing target information in response, thereby providing an indication as to where the volatile memory content should be transmitted. For example, an Internet Protocol (IP) address, URL, hostname, or other identifier may be provided. In some instances, the information further comprises a port number and/or an indication as to a communication protocol or data format.

Flow progresses to operation 404, where a storage location is determined based on the live migration request that was received at operation 402. For example, one or more received identifiers may be used to determine that the memory image should be stored in association with a specific execution environment and/or customer. It may be determined to store the memory image in a data store (e.g., data store 118 in FIG. 1) or to transmit the memory image to another device (e.g., computing device 106), among other examples.

At operation 406, volatile memory content of the execution environment is received and stored. For example, the memory may be received as a result of a virtualization manager (e.g., virtualization manager 112 in FIG. 1) performing aspects of operation 204 in FIG. 2. Arrow 407 is provided to indicate that, in some examples, receiving memory of the execution environment may be an iterative process. For example, data associated with an initial memory snapshot may be received, after which changes may be iteratively received. Flow may loop for a certain number of iterations or until an indication is received that the content of the received volatile memory content consistent with the volatile memory of the virtualization host. Operations 408 and 410 are illustrated used dashed boxes to indicate that, in some examples, operations 408 and/or 410 may be omitted such that method 400 terminates at operation 406.

Thus, in some instances, flow progresses to operation 408, where a processor state associated with the execution environment is stored. For example, the processor state may be received as a result of a virtualization manager performing aspects of operation 206 in FIG. 2. The processor state may be stored as part of the same file or blob or may be stored separately but in association with the memory image. As discussed above, any of a variety of other states may be received as an alternative to or in addition to the processor state. As noted above, operation 408 may be omitted, as may be the case when a processor state is not received in combination with the volatile memory content of the execution environment.

At operation 410, an indication is provided that the received data has been stored. In some instances, operation 410 is performed in response to verifying a checksum (e.g., as may be received in association with the volatile memory content received at operation 406) to verify that the received data matches that of the virtualization host. In other examples, the indication may be provided based on a determination that the received data matches an expected size for the memory capture. As noted above, operation 410 is illustrated using a dashed box to indicate that, in other examples, operation 410 may be omitted such an affirmative indication that the transmission is complete need not be provided. Flow terminates at operation 410.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
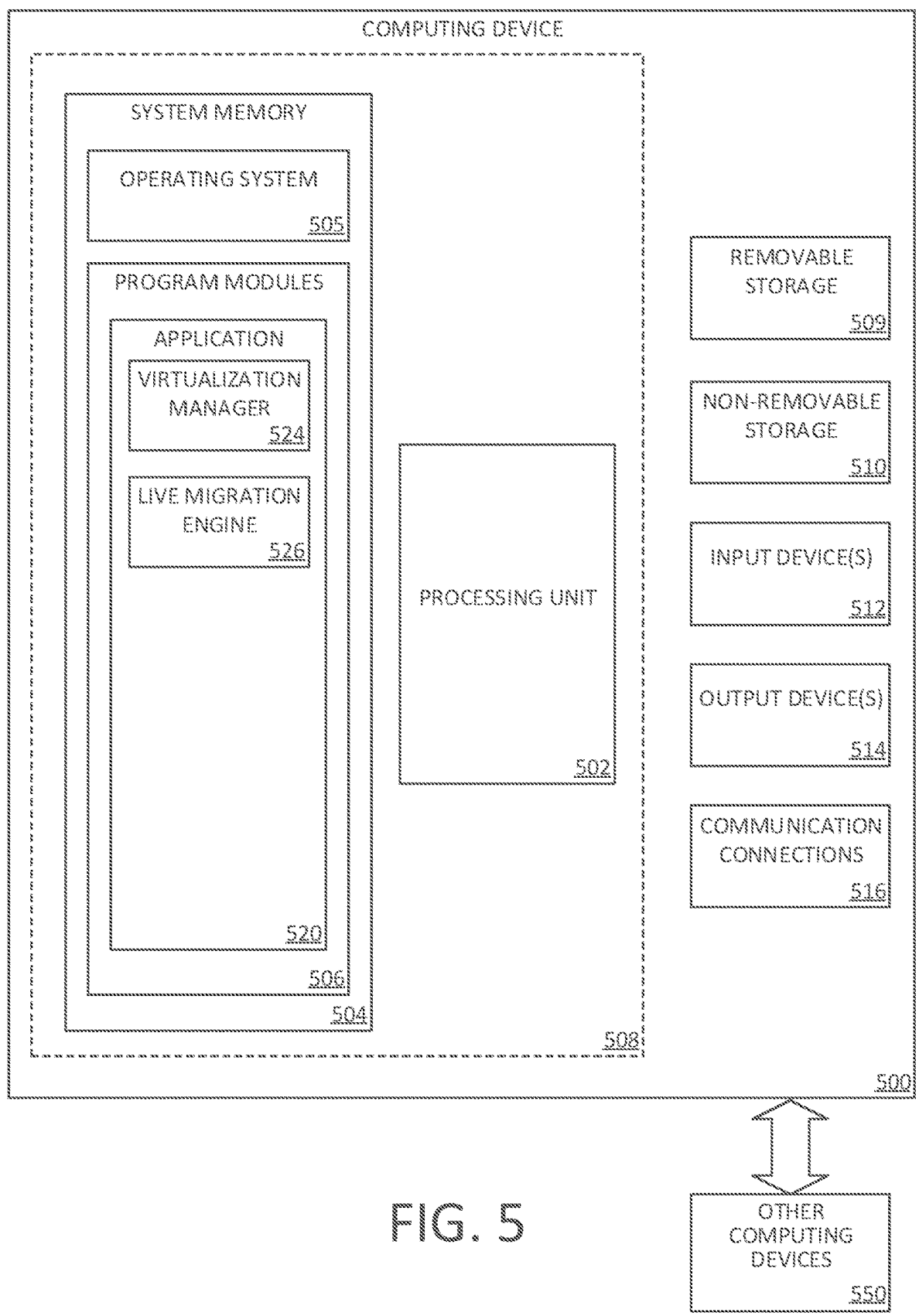
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above, including virtualization host 102, capture service 104, and computing device 106 in FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store virtualization manger 524 and live migration engine 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
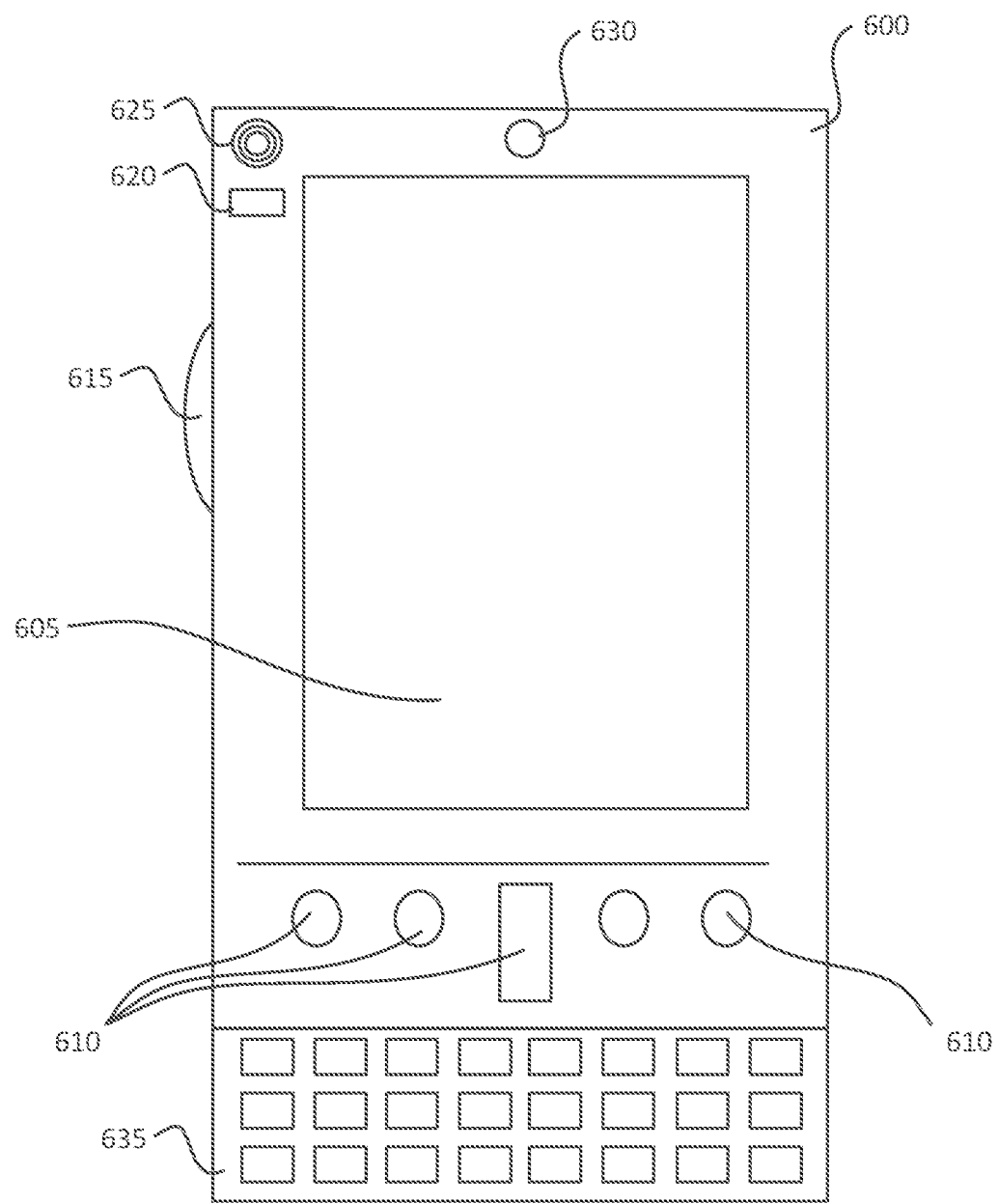
FIGS. 6A and 6B are simplified block diagrams of a mobile computing device with which aspects of the present disclosure may be practiced.
Figure 6B:
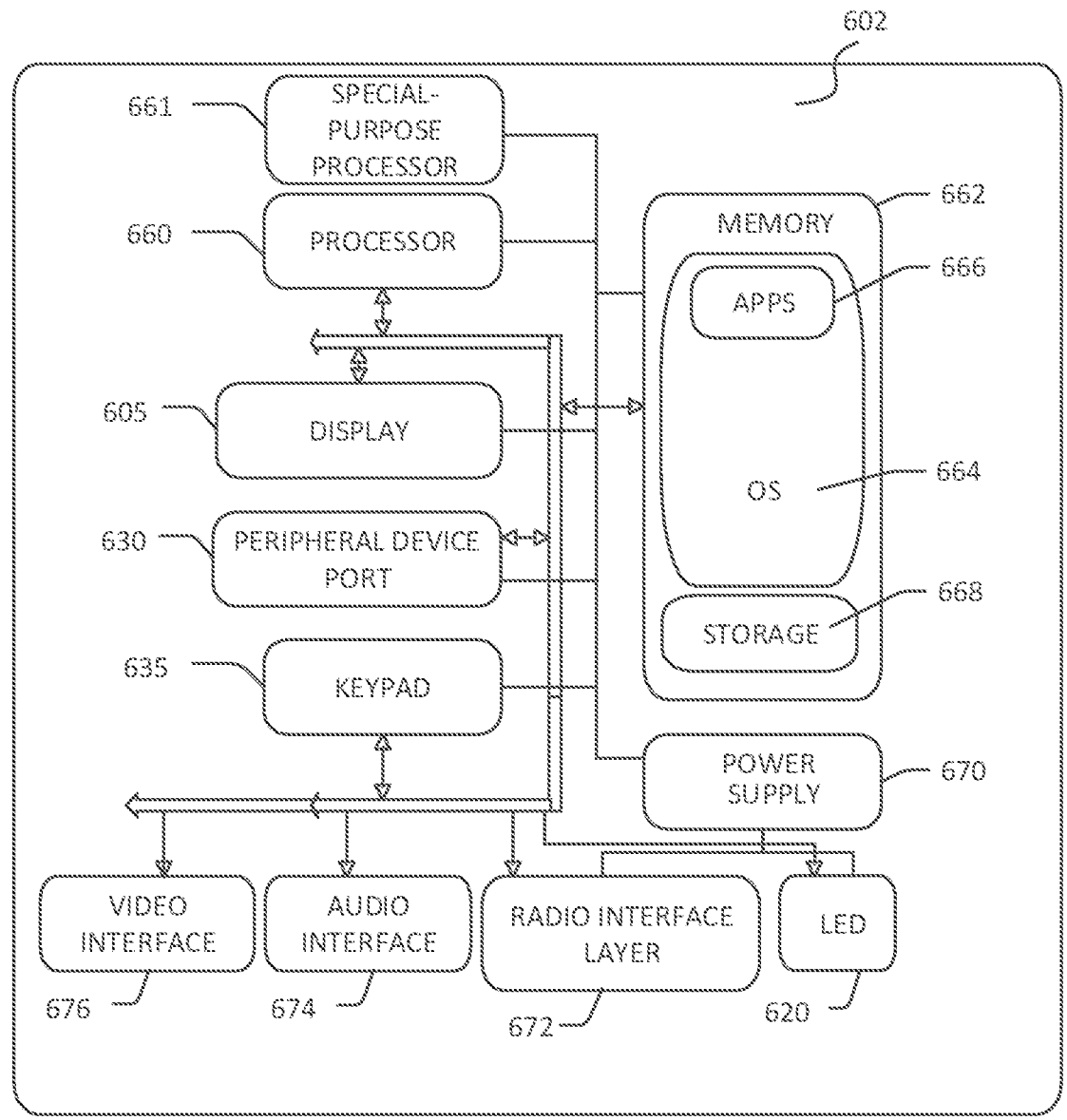

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625.

In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
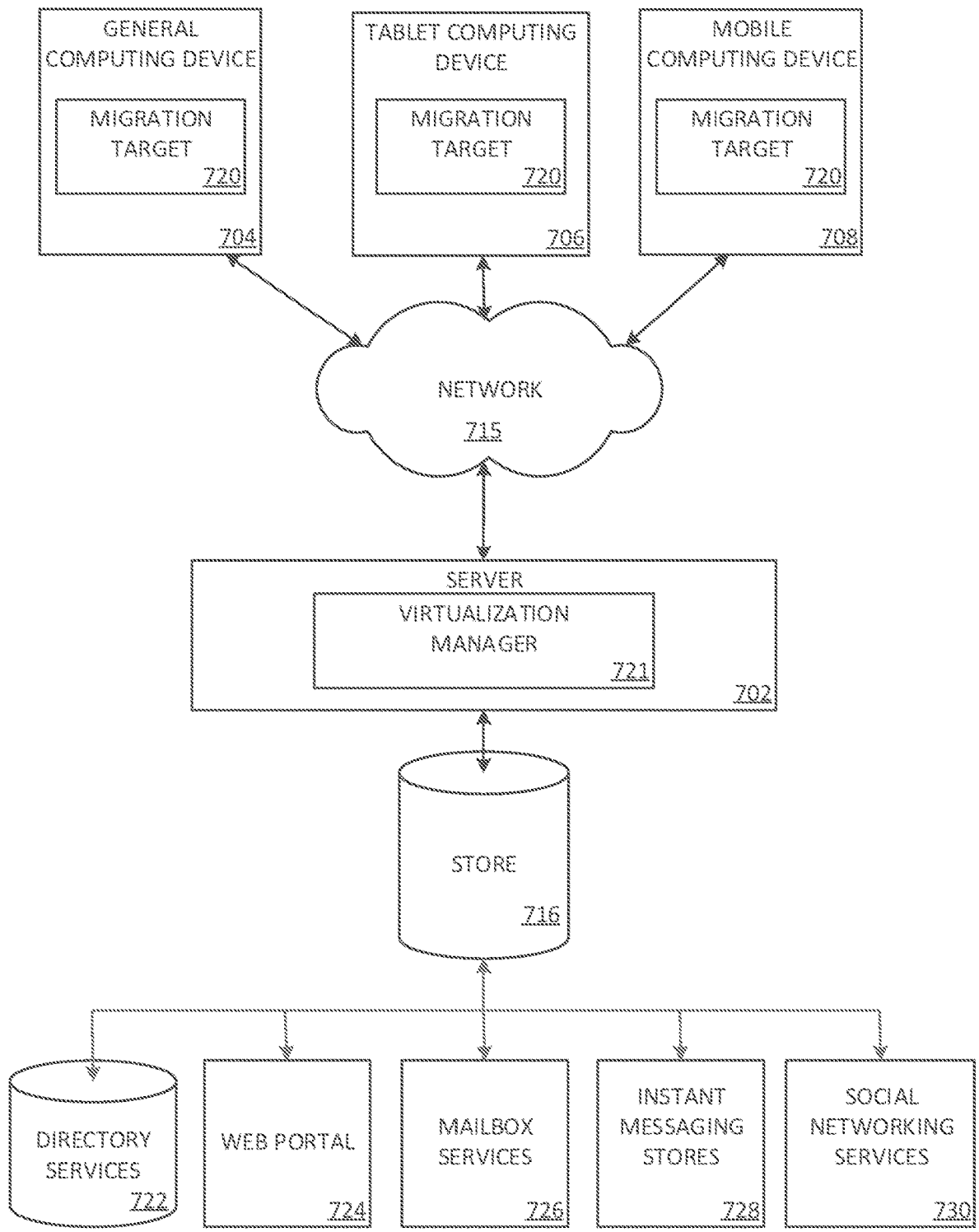
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

A migration target 720 may be employed by a client that communicates with server device 702, and/or virtualization manager 721 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
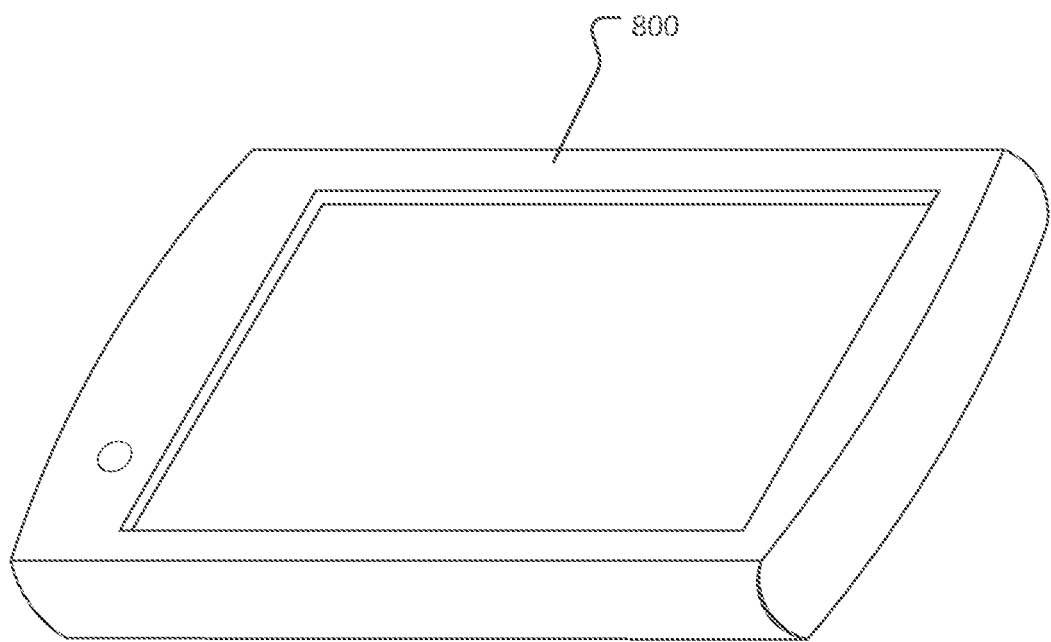
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving, as part of a live migration operation to migrate an execution environment of a virtualization host, data comprising volatile memory content associated with the execution environment; storing the data as a memory image associated with the execution environment; and providing an indication to the virtualization host to continue execution of the execution environment, thereby cancelling the live migration operation. In an example, the set of operations further comprises: receiving state information associated with a virtual processor of the virtualization host; and storing the state information in association with the memory image. In another example, the virtualization host comprises a hypervisor; the execution environment is a virtual machine; and the data comprising the volatile memory content is received from the hypervisor of the virtualization host. In a further example, providing the indication to the virtualization host comprises providing the indication to the hypervisor to cancel the live migration operation. In yet another example, the virtualization host comprises a live migration engine; and providing the indication to the virtualization host comprises providing the indication to the live migration engine to cancel the live migration operation by the hypervisor. In a further still example, the virtualization host comprises a container engine; the execution environment is a container; and the data comprising the volatile memory content is received from the container engine of the virtualization host. In an example, providing the indication to the virtualization host comprises providing the indication to the container engine to cancel the live migration operation.

In another aspect, the technology relates to a method for memory acquisition of an execution environment. The method comprises: determining target information for a memory imaging target; providing an indication to a hypervisor to initiate live migration of an execution environment, wherein the indication comprises the target information; determining that volatile memory content associated with the execution environment has been transmitted to the memory imaging target; and in response to determining that the volatile memory content has been transmitted, providing an indication to the hypervisor to continue execution of the execution environment. In an example, determining the target information comprises: establishing a communication channel with the memory imaging target; and receiving the target information from the memory imaging target via the communication channel. In another example, establishing the communication channel comprises: providing, to the memory imaging target, an identifier associated with the execution environment. In a further example, the received target information is usable to transmit the volatile memory content to the memory imaging target. In yet another example, determining that the volatile memory content has been transmitted comprises receiving an indication from the memory imaging target. In a further still example, determining that the volatile memory content has been transmitted comprises evaluating a state associated with the hypervisor.

In a further aspect, the technology relates to a method for memory acquisition of an execution environment. The method comprises: receiving, as part of a live migration operation to migrate the execution environment of a virtualization host, data comprising volatile memory content associated with the execution environment; storing the data as a memory image associated with the execution environment; and providing an indication to the virtualization host to continue execution of the execution environment, thereby cancelling the live migration operation. In an example, the method further comprises: receiving state information associated with a virtual processor of the virtualization host; and storing the state information in association with the memory image. In another example, the virtualization host comprises a hypervisor; the execution environment is a virtual machine; and the data comprising the volatile memory content is received from the hypervisor of the virtualization host. In a further example, providing the indication to the virtualization host comprises providing the indication to the hypervisor to cancel the live migration operation. In yet another example, the virtualization host comprises a live migration engine; and providing the indication to the virtualization host comprises providing the indication to the live migration engine to cancel the live migration operation by the hypervisor. In a further still example, the virtualization host comprises a container engine; the execution environment is a container; and the data comprising the volatile memory content is received from the container engine of the virtualization host. In an example, providing the indication to the virtualization host comprises providing the indication to the container engine to cancel the live migration operation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
      receiving, as part of a live migration operation to migrate an execution environment of a current virtualization host from the current virtualization host, data comprising volatile memory content associated with the execution environment;
      storing the data as a memory image associated with the execution environment; and
      providing, to the current virtualization host:
         a completion indication indicating successful receipt of the data as part of the live migration operation; and
         an indication to the virtualization host to continue execution of the execution environment at the current virtualization host, thereby terminating the live migration operation.

2. The system of claim 1, wherein the set of operations further comprises:
   receiving state information associated with a virtual processor of the virtualization host; and
   storing the state information in association with the memory image.

3. The system of claim 1, wherein:
   the current virtualization host comprises a hypervisor;
   the execution environment is a virtual machine; and
   the data comprising the volatile memory content is received from the hypervisor of the current virtualization host.

4. The system of claim 3, wherein providing the indication to the current virtualization host comprises providing the indication to the hypervisor to terminate the live migration operation.

5. The system of claim 3, wherein:
   the current virtualization host comprises a live migration engine; and
   providing the indication to the virtualization host comprises providing the indication to the live migration engine to terminate the live migration operation by the hypervisor.

6. The system of claim 1, wherein:
   the current virtualization host comprises a container engine;
   the execution environment is a container; and
   the data comprising the volatile memory content is received from the container engine of the current virtualization host.

7. The system of claim 6, wherein providing the indication to the current virtualization host comprises providing the indication to the container engine to terminate the live migration operation.

8. A method for memory acquisition of an execution environment, the method comprising:
- determining target information for a memory imaging target;
- providing an indication to a source hypervisor of a current virtualization host to initiate live migration of an execution environment from the current virtualization host, wherein the indication comprises the target information;
- determining that volatile memory content associated with the execution environment has been transmitted from the current virtualization host to the memory imaging target; and
- in response to determining that the volatile memory content has been transmitted, providing:
  - a completion indication indicating successful receipt of the data as part of the live migration; and
  - an indication to the source hypervisor to continue execution of the execution environment at the current virtualization host.

9. The method of claim 8, wherein determining the target information comprises:
- establishing a communication channel with the memory imaging target; and
- receiving the target information from the memory imaging target via the communication channel.

10. The method of claim 9, wherein establishing the communication channel comprises:
- providing, to the memory imaging target, an identifier associated with the execution environment.

11. The method of claim 9, wherein the received target information is usable to transmit the volatile memory content to the memory imaging target.

12. The method of claim 8, wherein determining that the volatile memory content has been transmitted comprises receiving an indication from the memory imaging target.

13. The method of claim 8, wherein determining that the volatile memory content has been transmitted comprises evaluating a state associated with the hypervisor.

14. A method for memory acquisition of an execution environment, the method comprising:
- receiving, as part of a live migration operation to migrate the execution environment of a current virtualization host from the current virtualization host, data comprising volatile memory content associated with the execution environment;
- storing the data as a memory image associated with the execution environment; and
- providing, to the current virtualization host:
  - a completion indication indicating successful receipt of the data as part of the live migration operation; and
  - an indication to the virtualization host to continue execution of the execution environment at the current virtualization host, thereby terminating the live migration operation.

15. The method of claim 14, further comprising:
- receiving state information associated with a virtual processor of the virtualization host; and
- storing the state information in association with the memory image.

16. The method of claim 14, wherein:
- the current virtualization host comprises a hypervisor;
- the execution environment is a virtual machine; and
- the data comprising the volatile memory content is received from the hypervisor of the current virtualization host.

17. The method of claim 16, wherein providing the indication to the current virtualization host comprises providing the indication to the hypervisor to terminate the live migration operation.

18. The method of claim 16, wherein:
- the current virtualization host comprises a live migration engine; and
- providing the indication to the virtualization host comprises providing the indication to the live migration engine to terminate the live migration operation by the hypervisor.

19. The method of claim 14, wherein:
- the current virtualization host comprises a container engine;
- the execution environment is a container; and
- the data comprising the volatile memory content is received from the container engine of the current virtualization host.

20. The method of claim 19, wherein providing the indication to the current virtualization host comprises providing the indication to the container engine to terminate the live migration operation.

* * * * *